United States Patent [19]

Khan et al.

[11] 4,246,652
[45] Jan. 20, 1981

[54] SEISMIC SOURCE SIGNATURED EVALUATION APPARATUS

[75] Inventors: Tawassul A. Khan, Cypress, Tex.; Michel P. Moesse, Windsor, England

[73] Assignee: Geosource Inc., Houston, Tex.

[21] Appl. No.: 891,339

[22] Filed: Mar. 29, 1978 (Under 37 CFR 1.47)

[51] Int. Cl.³ .................. G01V 1/30; G01V 1/36
[52] U.S. Cl. ............................. 367/42; 367/47; 364/421
[58] Field of Search ............... 340/15.5 TA, 15.5 SC, 340/15.5 PP, 146.3 AG; 364/421; 346/33 C, 33 R; 181/113, 121; 73/589, 594, 1 DV, 587; 367/41, 42, 47, 190

[56] References Cited

U.S. PATENT DOCUMENTS

| | | | |
|---|---|---|---|
| 2,999,225 | 9/1961 | Gregg et al. | 73/1 DV |
| 3,114,090 | 12/1963 | Davis et al. | 346/33 R |
| 3,130,809 | 4/1964 | Flatow | 181/127 |
| 3,447,752 | 8/1948 | Hathaway | 346/33 R |
| 3,694,635 | 9/1972 | Hoetzel et al. | 346/33 R |
| 3,886,493 | 5/1975 | Farr | 340/15.5 TA |
| 3,900,825 | 8/1975 | Hinnant | 340/15.5 TS |
| 3,913,085 | 10/1975 | Farstad | 340/15.5 PP |
| 4,007,631 | 2/1977 | Saifi et al. | 73/587 |
| 4,011,924 | 3/1977 | Barbier | 181/121 |

Primary Examiner—Nelson Moskowitz
Attorney, Agent, or Firm—Arnold, White & Durkee

[57] ABSTRACT

Apparatus is provided for determining the conformity of an energy pulse generated by a weight drop seismic source to a defined energy pulse characteristic in order that reflections associated with a non-conforming energy pulse can be rejected. The apparatus operates to compare the signature of a weight drop with a signature standard. Incoming seismic data is rejected and not recorded if the difference between the incoming signature pulse shape and the standard signature pulse shape is too great. The pulse shape of the incoming signature is analyzed by comparing a sample of the incoming signature amplitude to upper and lower rejection limits derived from a time correlated amplitude sample of the standard signature. The upper and lower rejection limits against which an incoming signature sample is compared are proportional to the amplitude of the time correlated standard signature sample. Each pair of upper and lower rejection limits is produced by multiplying each standard signature sample by a multiplier that is less than one for the lower limit and greater than one for the upper limit. The multiplication function is implemented by a sequential weighted adder. After a prescribed number of incoming signature samples have fallen outside the rejection limits, an indication that the energy pulse is bad is indicated.

18 Claims, 11 Drawing Figures

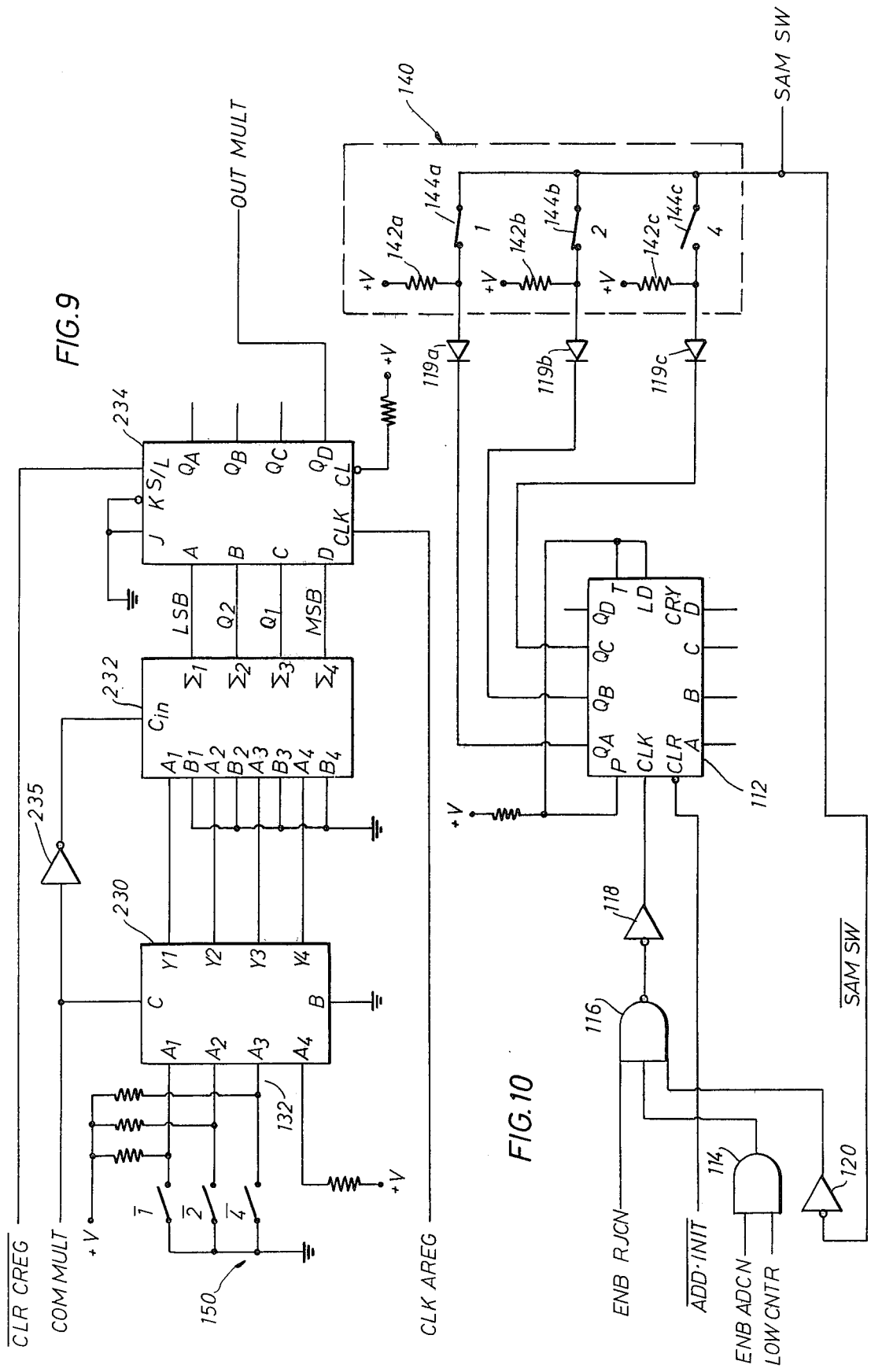

SEISMIC SOURCE SIGNATURED EVALUATION APPARATUS

BACKGROUND OF THE INVENTION

The present invention in one aspect relates to seismic geophysical prospecting apparatus; and more particularly, it relates to apparatus for use therein to improve the quality of recorded seismic data by determining the conformity of an energy pulse emitted by an emission source to defined energy pulse characteristics.

The present invention relates in another aspect to electronic apparatus for analyzing the waveform shape of an electrical signal input thereto to determine its conformity with a defined waveform shape; and more particularly, it relates to electronic apparatus for so analyzing an electric signal that is representative of the energy pulse emitted from a seismic source.

In geophysical prospecting of the earth's strata by the creation of seismic waves, permitting seismic profiles to be obtained of a selected geological area, discrete energy pulses are emitted from an emission source to create mechanical waves in a stratum that are reflected back to seismometers.

Seismic prospecting of geological strata utilizes energy emission sources which are either of an explosive type disposed beneath the ground surface, or a source operating on the surface, such as a dropping weight. In weight drop seismic prospecting, several weight drop seismic sources are utilized in relation to a single line of geophones. The weight drop seismic sources are sequentially activated to transmit successive energy pulses into the strata at separated locations within the selected geographical area. Reflections of the wave produced by each energy pulse are received by a single line of geophones, with the reflected waves being transduced into representative electrical signals that are subsequently processed and recorded.

Since geophysical prospecting using weight drop seismic sources requires that the sources be spatially separated, it is typically the case that each of the weight drop seismic sources operates at a location having a topography that is at variance with the topography of the locations at which each of the other weight drop seismic sources operates. Therefore, the energy pulses transmitted into the strata by the seismic sources may be at variance with one another, and the resulting reflections will correspondingly exhibit dissimilar waveform characteristics. A variation between energy pulses emitted by separated weight drop seismic sources will be particularly likely to exist when prospecting operations are being carried out in geographical areas that exhibit a rough terrain, such that the area of contact between the ground and the dropped weight differs for each seismic source.

In order to improve the signal-to-noise ratio of seismic reflection data before velocity determination by computer processing, it has become common practice to sum several traces having the same source-to-geophone separation but different common depth points. This procedure is referred to as "vertical stacking".

Since vertical stacking entails the summation of all output traces from a particular geophone, the shape of the signals on all traces must be identical. Variations in the seismic source energy pulses that produce the trace data will reduce the quality of the stack due to the dissimilar characteristics of the reflections from drop to drop.

Therefore, particularly when multiple weight drop seismic sources are utilized in geophysical prospecting, it is necessary for a satisfactory vertical stacking procedure that the energy pulses transmitted by the sources be substantially identical, such that the reflections of each of the energy pulses will be of similar characteristics.

SUMMARY OF THE INVENTION

In one aspect of the present invention, the quality of seismic data presented for analysis, and particularly data derived by "stacking" techniques, is improved by recording only reflections of seismic energy pulses having similar characteristics. Such result is obtained by determining the conformity of an energy pulse transmitted into the earth's strata to defined energy pulse characteristics, and rejecting seismic data associated with a non-conforming energy pulse.

In accordance with this aspect of the present invention, apparatus for receiving and recording reflected seismic waves is provided with means for determining the conformity of an energy pulse emitted by an emission source to produce reflected seismic waves with a defined characteristic for desired energy pulses, and means to inhibit the recording of reflected waves produced by a non-conforming energy pulse.

In practical implementation of the invention, suitable means for determining the conformity of an energy pulse can be one that analyzes an electrical signal representative of an energy pulse. In the case of a weight drop seismic source, the electrical signal can be that derived from the output of an accelerometer mounted on the weight, and referred to as the "signature".

In a particular embodiment of the invention so implemented, analysis of the source signature involves an analysis of the waveform shape of the signature over a defined period of time. Although other techniques for analysis of an electrical signal might satisfactorily be utilized within the general concepts of the invention, in analyzing a seismic source signature, waveform shape analysis is regarded as being preferred.

The waveform of an electrical signal generated by an accelerometer mounted on a dropped weight (i.e., the signature) comprises a pulse of positive amplitude followed by "ringing" that gradually dampens out. A suitable determination of energy pulse characteristics may be made by analyzing only the pulse portion of the signature waveform.

Also in accordance with this manner of practical implementation of the invention, the determination of the conformity of an energy pulse to defined characteristics is by comparing a source signature to a reference standard signal representative of the desired energy pulse characteristic, the reference standard signal being derived from a reference standard energy pulse.

In a particular embodiment which implements the invention with means for analyzing an electrical signal representative of a generated energy pulse, which means includes means for comparing the electrical signal to a reference standard signal representative of an energy pulse having the desired energy pulse characteristics, the signal analysis can be by an analysis of the pulse shape of the source signature, and the comparison can be by a comparison of each of a plurality of samples of the signature to reference standard amplitude levels derived from time correlated samples of the reference standard signal. In such embodiment, the amplitude of the positive pulse portion of a signature is periodically sampled a particular number of times. Each signature sample is compared to a time correlated sample of the amplitude of a reference standard signal derived by sampling of the reference standard signal on the same periodic basis.

In accordance with a more specific feature of this particular embodiment for implementing the invention, a plurality of upper and lower signature sample amplitude limits are established, with each limit of each pair of limits constituting a reference standard amplitude level against which the corresponding signature sample is to be compared. The deviation of the upper and lower amplitude limits from the reference standard signal sample amplitude from which each limit of each pair of limits is derived, is proportional to the amplitude of the reference standard signal sample.

The upper and lower limits are preferably established by means for multiplying each reference standard signal sample by a multiplier, with the upper limit being established by multiplying by a multiplier greater than one and the lower limit being established by multiplying by a multiplier less than one. Since the upper and lower amplitude limits are proportional to the reference standard signal sample amplitude levels, upper and lower envelopes are effectively created around the waveform of the reference standard signal and an area of acceptance is defined therebetween.

In the practical implementation of the invention in accordance with a particular embodiment, the means for determining the conformity of an energy pulse with defined energy pulse characteristics comprises (a) means for analyzing the waveform shape of an electrical signal representative an energy pulse by comparing each of a plurality of samples of the amplitude of the electrical signal source to upper and lower reference standard amplitude levels which define an area of acceptance around the waveform of a reference standard signal representative of an energy pulse exhibiting the defined pulse characteristic, and further comprises (b) means for counting the number of electrical signal samples that fail to fall within the defined area of acceptance. The conformity determining means may further comprise means for indicating the conformity of an energy pulse in response to the number of samples recorded by the counting means.

In another aspect of the present invention, apparatus is provided for analyzing an electrical signal to determine the conformity of the shape of the signal waveform over a defined period of time to a reference standard waveform shape. In accordance with the invention as it relates to this aspect, such apparatus includes means for providing amplitude samples of a reference standard signal having a desired waveform shape. The apparatus further includes means for establishing upper and lower electrical signal sample amplitude reference limits for each of a plurality of amplitude samples of an electrical signal being analyzed. The upper and lower limits established for each sample are preferably proportional to the amplitude of a sample of the reference standard signal that is time correlated to the electrical signal sample.

The apparatus may further comprise means for counting the number of samples of the electrical signal being analyzed that fail to fall within an area of acceptance established between upper and lower envelopes defined by the upper and lower sample amplitude reference limits for all samples, with the count number indicating the conformity of the analyzed signal to the reference signal.

In a particular embodiment of this aspect of the invention, samples of a reference standard signal are maintained in a memory and are selectively readable therefrom on command. The upper and lower sample amplitude reference limits are established by means for multiplying each sample of the reference standard read from memory by a multiplier provided in the form of a binary number. The multiplying means is implemented by a sequential weighted adder comprising a shift register for loading a binary word read out of memory and subsequently shifting the word upon command, to change the binary value of the word presented a storage register for maintaining a binary word therein, and an adder for adding the binary word in the shift register to that in the storage register, with the output of the adder being applied back to the input of the storage register. Means for providing a binary word multiplier may also be included. Timing logic is further provided for issuing a shift command to the shift register and a load command to the storage register with the load command being in accordance with the bit values of the binary word multiplier.

BRIEF DESCRIPTION OF THE DRAWINGS

A more complete appreciation of the invention may be had by reference to the accompanying drawings illustrating a particular embodiment of the invention which is to be described in detail and in which:

FIGS. 4–10 are schematic diagrams of circuitry for implementing the signature evaluation apparatus diagrammed in FIG. 3.

DETAILED DESCRIPTION OF AN ILLUSTRATIVE EMBODIMENT OF THE INVENTION

I. General Discussion

From the laws of physics, it is apparent that the energy pulse generated by a weight drop seismic source will be a function of the mass of the weight dropped and the height from which it is dropped. However, the waveform characteristics of the energy pulse transmitted into the earth's strata will be seen to be a function of the area of contact between the ground surface and the weight and of the composition of the ground onto which the weight is dropped.

In order to conveniently ascertain the characteristics of the energy pulse transmitted into a geological formation being surveyed, a signal may be derived that is representative of the waveform of the energy pulse generated by the impact of the weight on the ground. Because the energy pulse generated by a dropped weight is proportional to the deceleration to which the weight is subjected upon impact, a signal representative of the energy pulse can be derived from an accelerometer mounted on the weight. The signal obtained from the output of the accelerometer is referred to as the "signature" of the weight drop seismic source.

Figure 1:
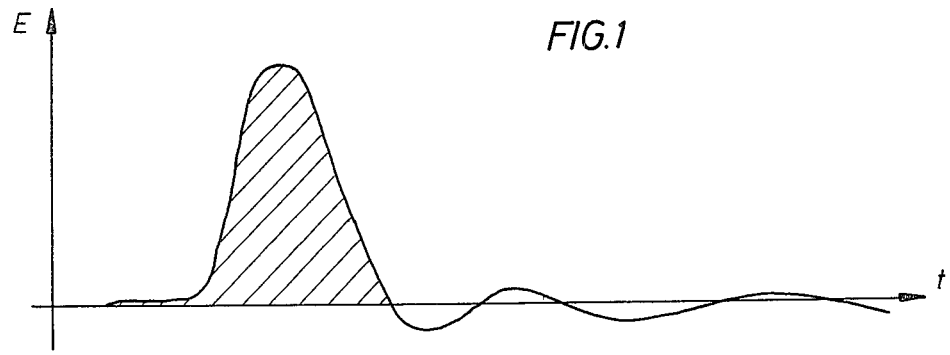
FIG. 1 is a graphical representation of a typical weight drop seismic source signature obtained from an accelerometer mounted on the drop weight.

The waveform shape of the derived signal will be adequate to define both the frequency spectrum and the phase spectrum of the transmitted energy pulse. The signature of a weight drop seismic source operating in a level ground area is shown in FIG. 1. The signature is predominantly a pulse of positive amplitude followed by a "ringing" that is gradually dampened. Since the predominant portion of the waveform is the positive amplitude pulse portion of the waveform, the characteristics of the transmitted energy pulse can be accurately ascertained by an analysis of the positive lobe of the pulse.

By evaluating the transmitted energy pulse from a seismic source through an analysis of the source signature, an energy pulse having characteristics substantially at variance from the others in an arrangement of multiple seismic sources can be recognized, and a decision made to reject seismic data to be derived from reflections attributable to an undesirable energy pulse.

Electrical signals can be analyzed in a number of different ways, including frequency spectrum analysis, numerical integration, and waveform shape determination. It is believed, however, that the process of numerical integration does not afford an accurate definition of the phase spectrum of a signature pulse waveform, and that frequency spectrum analysis is overly complex and too difficult to incorporate into existing seismic data acquisition units. Accordingly, the preferred analysis technique, and that employed in the illustrative embodiment to be described in detail herein, is that of signature pulse shape determination.

In general, analysis of the seismic source signature in this manner involves sampling the amplitude of the signal at a plurality of points in time and comparing each sample value with a time correlated reference standard amplitude level.

Figure 2:
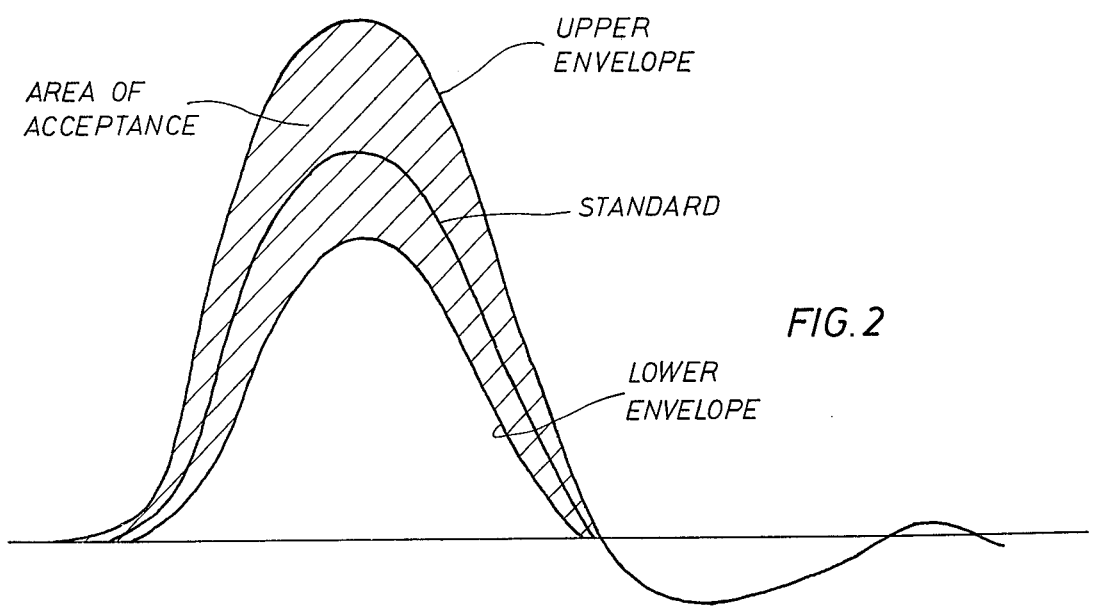
FIG. 2 is a grahical representation of the upper and lower envelopes defined about a reference standard signature by upper and lower rejection limits formulated in accordance with the signal analysis technique of the present invention.

More particularly, a comparison is to be made between a sample of the incoming signature and a reference amplitude level. The reference level for each sample of an incoming signature is derived from a time correlated sample of a reference standard signature. The standard sample is used to define upper and lower signal sample amplitude limits which are proportional to the amplitude of the reference standard sample. Accordingly, if all samples of the reference standard signature are considered, an area of acceptance will be defined between upper and lower envelopes, as shown in FIG. 2 which are created by the plurality of upper and lower amplitude limits.

The reference standard signature to which the incoming signature is compared on a sample-to-sample basis may be acquired by prerecording a signature which, if it is acceptable, is used as the reference standard. The pulse shape of the reference standard signature can be monitored on an oscilloscope as it comes in and its shape verified as being acceptable.

To facilitate the comparison of the incoming signature samples and the reference amplitude levels derived from the reference standard signature samples, it is desirable to reduce the sample values to a numerical form, as by digitizing the sample values, and presenting each sample as a binary word. Accordingly, each of the signals is represented by a certain number of binary words correlated in time.

If a sample of the incoming signature does not fall within the area of acceptance defined by the upper and lower envelopes, the sample is declared unfit and rejected. An indication of the conformity of the incoming signature signal waveform to the reference standard is made based upon the rejection of a prescribed number of samples, whereupon the acceptance or rejection of the incoming seismic data based upon the foregoing analysis of the incoming signature is indicated. Conversely, if a predetermined number of incoming signature samples fall within the area of acceptance, the incoming seismic data may be accepted and added to the stack.

II. Illustrative Embodiment of the Invention

A. Block Diagram

Figure 3:
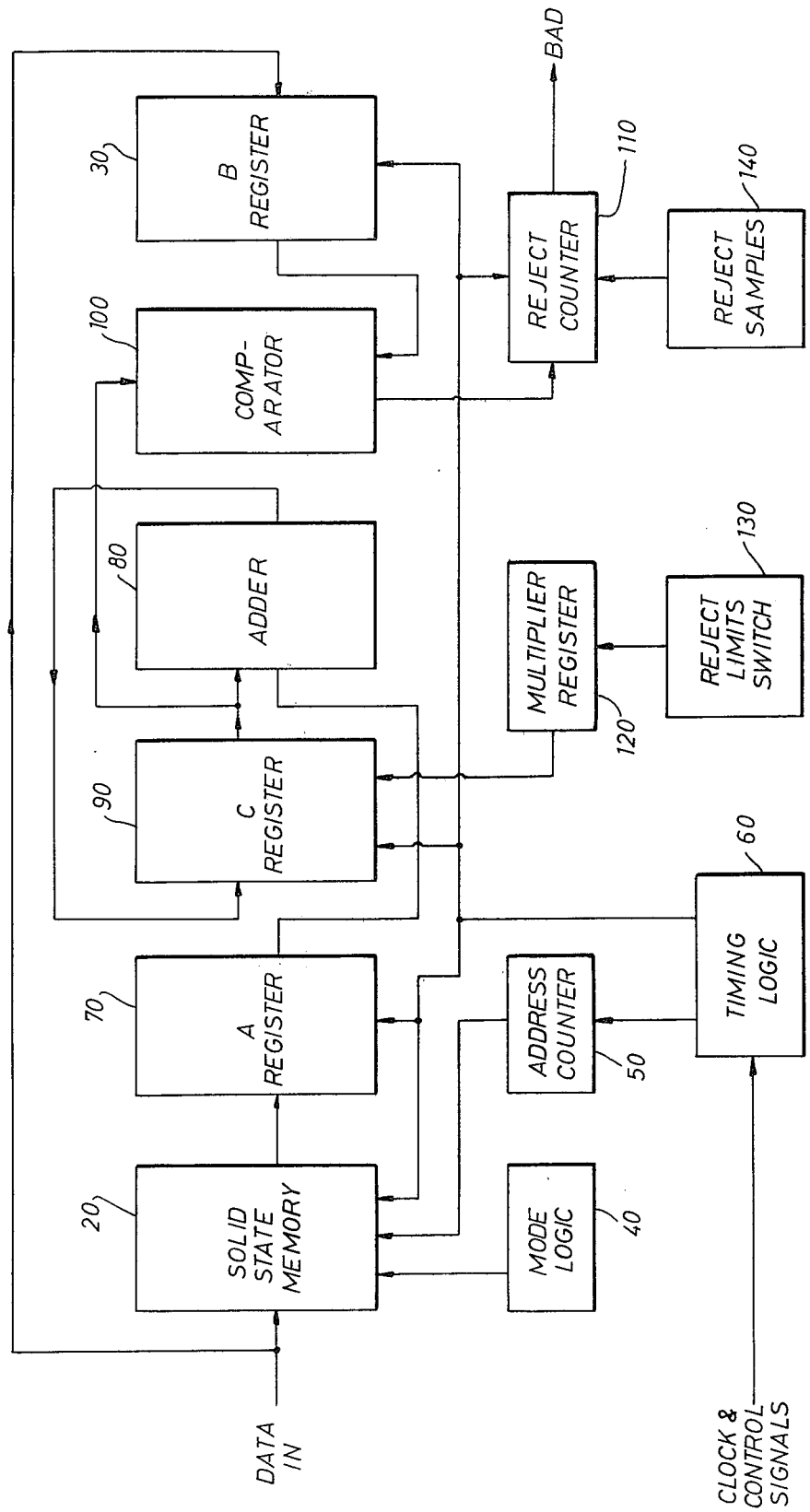
FIG. 3 is a block diagram of apparatus for analyzing an analog signal, particularly a seismic source signature which is representative of the energy pulse transmitted by a weight drop seismic source.

Referring now to FIG. 3, there is presented a block diagram of electronic apparatus for analyzing an electrical signal representative of the energy pulse produced by a seismic source to determine its conformity with desired signal characteristics. The embodiment of the present invention shown therein is designed to be compatable with an MDS-8 Field Recorder manufactured by the Mandrel Division of Geosource, Inc. More specifically, the seismic source signature evaluation apparatus is to be incorporated in an MDS-8 Field Recorder between the output of the Instantaneous Floating Point (IFP) amplifier and the input of the arithmetic unit of the field recorder.

DATA IN to the Signature Evaluation Apparatus 10 is obtained from the analog-to-digital converter in the MDS-8 Field Recorder. The seismic source signature is made available to the A/D converter by way of two auxilliary inputs to the floating point amplifier. The effective rate of sampling of the incoming signature is 2 msec. DATA IN consists of a ten bit binary word. When data is valid on the output of the A/D converter, the A/D clock ($\overline{\text{A/D CLCK}}$) occurs. Further details of a suitable IFP amplifier or A/D converter for operating with Signature Evaluation Apparatus 10 may be had by reference to MDS-10 Field Recorder Service Manual 387907-60EM, which publication is incorporated herein by reference.

DATA IN to the Signature Evaluation Apparatus 10 is applied to a SOLID STATE MEMORY 20. Switching of MEMORY 20 between the write mode and the read mode is controlled by MODE LOGIC 40. MEMORY 20 is the loaded and unloaded under the control of the ADDRESS COUNTER 50 and TIMING LOGIC 60.

The Signature Evaluation Apparatus 10 has two modes of operation. In Mode 1, the signature reference standard is acquired, and DATA IN from the A/D converter is loaded into MEMORY 20. During the reference signature acquisition mode, a source signature is periodically sampled and stored in the memory as 16 words of ten bits each. That is, the positive lobe of a source signature that is to be the reference standard is sampled sixteen times at a 2 msec. sample rate.

The output of MEMORY 20 is applied to A REGISTER 70. The contents of A REGISTER 70 is output to ADDER 80, which also receives the output of C REGISTER 90. The output of ADDER 80 is fed back to the input of C REGISTER 90.

The binary word contents of C REGISTER 90 and the binary word contents of B REGISTER 30 are applied to COMPARATOR 100 which outputs a signal to REJECT COUNTER 110 that indicates the result of a comparison of the contents of B REGISTER 30 and C REGISTER 90. The binary word in B REGISTER 30 is obtained as DATA IN from the A/D converter of the field recorder IFP amplifier in Mode 2 operation.

In Mode 2, following a reference standard signature acquisition, the Signature Evaluation Apparatus 10 loads the digitized samples of the incoming signature into B REGISTER 30, while at the same time the contents of MEMORY 20 is unloaded into A REGISTER 70. As each sample of the incoming signature is loaded into B RESITER 30, a time correlated sample of the reference standard signature is unloaded from memory into the A REGISTER.

In order to define an area of acceptance and provide for some predetermined degree of deviation from the reference standard signature, upper and lower amplitude limits for incoming signature each sample are developed and applied to COMPARATOR 100 as a binary word.

Since it is desired that the upper and lower amplitude limits be proportional to the amplitude of the reference standard signature sample, each reference standard signature sample word from the memory is multiplied by a certain number, depending upon the desired tolerance to be maintained. As will be understood from a brief reference to FIG. 2, if the upper and lower amplitude limits for all samples of the reference standard are considered, upper and lower envelopes around the reference standard will be defined. Accordingly, the upper limit envelope, as shown in FIG. 2, is generated by a multiplier that is greater than one. The lower limit envelope, also shown in FIG. 2, is generated by multiplying by a mulitplier that is less than one.

The upper and lower amplitude limits against which an incoming sample is to be compared are computed by a multiplier circuit which comprises A REGISTER 70, C REGISTER 90, and ADDER 80. The multiplier circuit works as a sequential weighted adder and computes the product $P = K \times V$, where K is the multiplier (Ku or Kl) and V is the value of a reference standard signature sample read out of MEMORY 20. Pu will denote the upper limit and Pl the lower limit, with $Pu = Ku \times V$ and $Pl = Kl \times V$, respectively.

The REJECT LIMITS SWITCH 130 has eight positions (0–7). The value of the multiplier K is given in binary for all eight positions in the table below. As will be noted, K is a four bit binary word of the following format:

MSB·$Q_1Q_2$LSB

As will be understood, the MSB of the multiplier has a binary weight of 1. The weight of $Q_1$ is $\frac{1}{2}$ and $Q_2$ is $\frac{1}{4}$. The LSB has a weight of $\frac{1}{8}$.

| Reject Limits Switch Position | Multiplier Ku | Kl |
|---|---|---|
| 0 | 1.000 | 1.000 |
| 1 | 1.001 | 0.111 |
| 2 | 1.010 | 0.110 |
| 3 | 1.011 | 0.101 |
| 4 | 1.100 | 0.100 |
| 5 | 1.101 | 0.011 |
| 6 | 1.110 | 0.010 |

-continued

| Reject Limits Switch Position | Multiplier Ku | Kl |
|---|---|---|
| 7 | 1.111 | 0.001 |

Since binary multiplication is, in effect, successive summation, two binary numbers can be multiplied by shifting one of the binary numbers for each bit of the other binary number and adding the shifted number to the previous number for every bit that is a "1". Accordingly, multiplication of the reference standard sample word V in the A Register by the multiplier word set in the Multiplier Register can be performed by sequential adding and shifting of the reference standard sample according to the multiplier word using the C Register and the Adder.

By way of example, assume that the Reject Limit Switch is in position three (3). Ku is 1.011. The multiplier circuit will multiply V by 1.011 by adding $V + \frac{1}{4}V + \frac{1}{8}V$. Note that $\frac{1}{2}V$ is not added; therefore $Pu = V(1 + \frac{3}{8})$. Similarly, for Kl = 0.101, $Pl = \frac{1}{2}V + \frac{1}{8}V = \frac{5}{8}V$, or $Pl = V(1 - \frac{3}{8})$. Therefore, the limits defined by the Rejection Limits Switch are symmetrical, i.e., the upper limit will be V+E and the lower limit V−E, where E is V times the multiplier K.

If the sample of the incoming signature is greater than the upper limit, or if it is less than the lower limit, REJECT COUNTER 110 is incremented. After the Reject Counter has been incremented a certain number times, which is selectable by the Reject Samples Switch, an indication thereof (BAD) is set. In response to the condition of BAD, incoming seismic data is accepted or rejected based upon the analysis of the received signature to determine the conformity of the associated source energy pulse with the defined characteristics embodied in the reference standard signature.

B. Preferred Circuit Configurations

Figure 4:
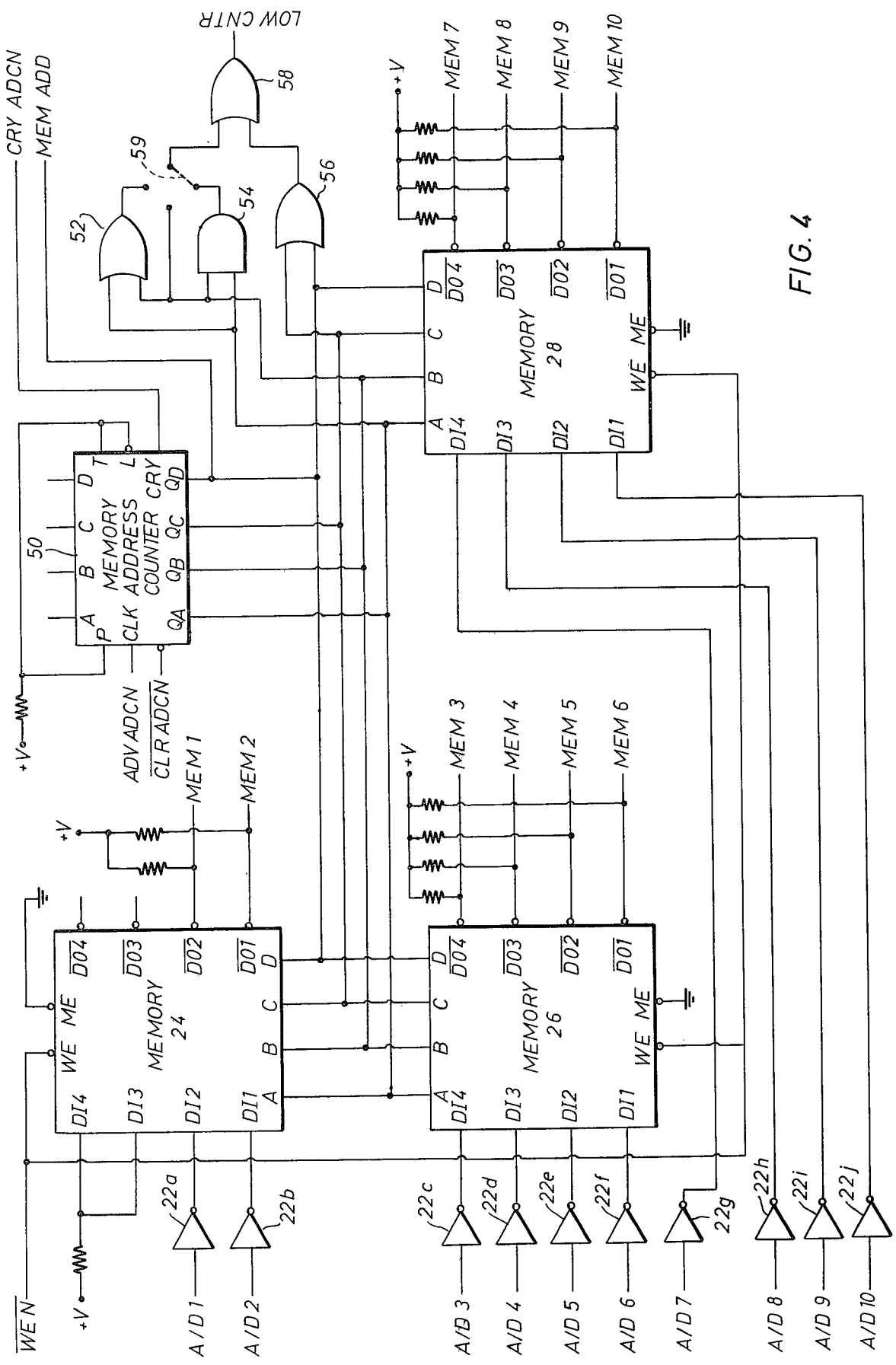

Referring now to FIG. 4, circuitry for implementing solid state memory 20 is shown. Data from the analog-to-digital converter in the floating point amplifier is made available over input lines A/D 1 through A/D 10 to inverters 22a through 22j. After inversion, the A/D converter data is applied to the data inputs of memory chips 24, 26, and 28. Data word bits stored in the memories are inverted and presented at outputs of the memory chips, which are open collector outputs loaded by 4.7 K resistors. Writing into the memory chips is accomplished by write enable ($\overline{\text{WEN}}$), with the memory chips being forced into the write state when write enable goes "low".

The memory cells within the memory chips are addressed by memory address counter 50, which defines sixteen addresses. Address counter 50 is clocked by advance address counter (ADV ADCN).

In the preferred circuitry shown in FIG. 4, memory chips 24, 26 and 28 are preferably sixty-four bit random access memories organized as sixteen words of four bits each. A suitable device for implementing each memory chip is a type SN7489N integrated circuit. Memory address counter 50 is preferably a four bit synchronous binary counter of the type SN74161N.

Combination logic comprising gates 52, 54, 56 and 58 decodes the count of address counter 50 and makes available a low count reached signal (LOW CNTR) based upon the setting of hard wire connection 59.

Figure 5:
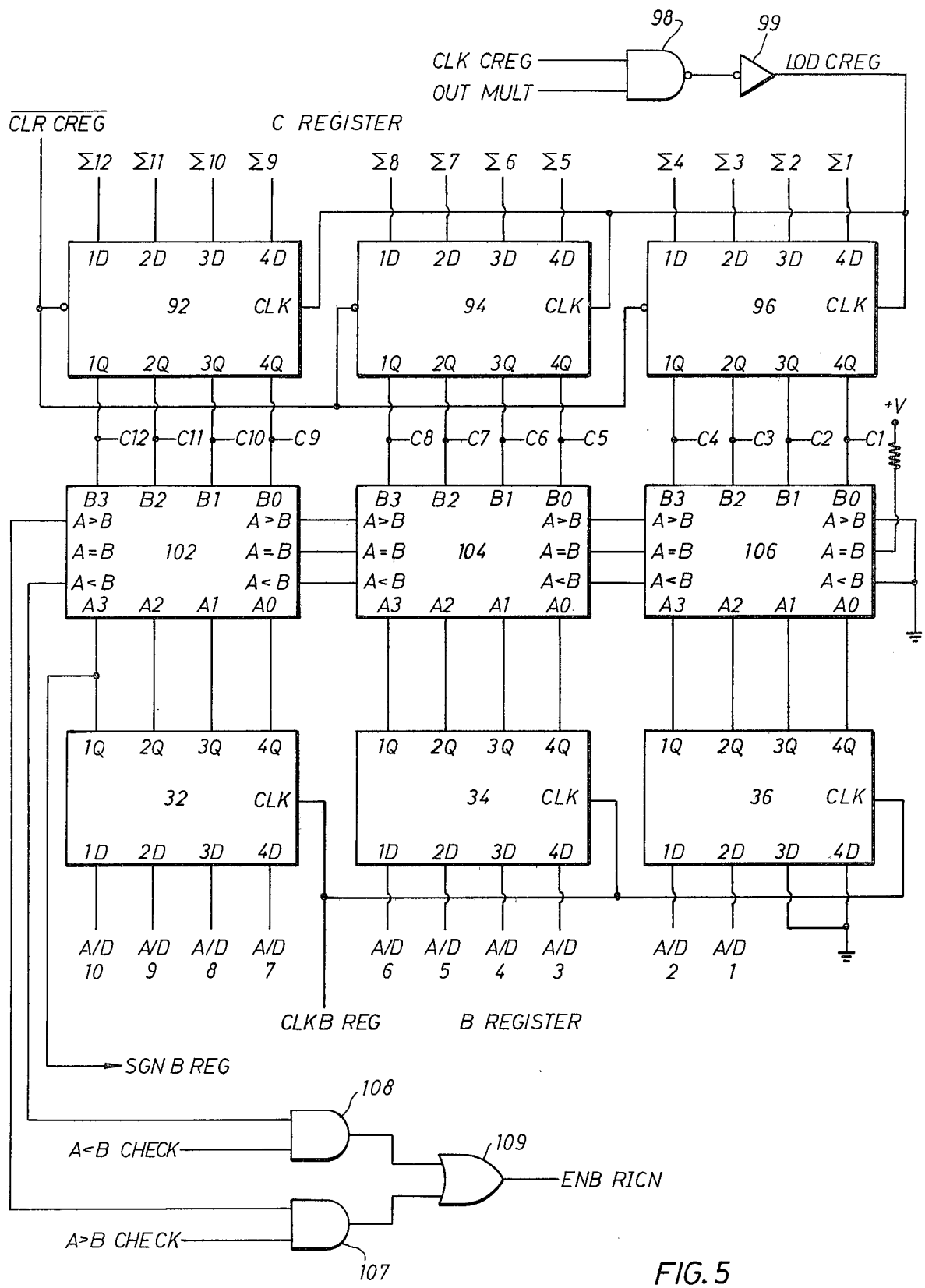

Referring now to FIG. 5, the A/D converter data is applied without inversion to four bit storage registers 32, 34 and 36 which comprise B Register 30. DATA IN from the A/D converter is entered during a comparison cycle into the storage registers by clock B Register (CLK B REG). Storage registers 32, 34 and 36 are preferably type SN74LS175N integrated circuits.

The contents of each storage register is applied to a respective four bit magnitude comparator 102, 104 and 106. Each magnitude comparator performs a comparison of two binary words. Three decoded decisions about two four bit words are made and are externally available as three separate outputs. To compare two words of twelve bits each comparators 102, 104 and 106 are cascaded, with the final decoding decision being available from the "A greater than B" and "A less than B" outputs of comparator 102.

The other binary word involved in the comparison is that contained in storage registers 92, 94 and 96, which together comprise C Register 90. The binary word contained in storage registers 92, 94, and 96 is derived from Adder 80, which is shown in greater detail in FIG. 6. The binary word is entered into the registers at the occurrence of load C Register (LOD CREG) derived from logic comprising NAND gate 98 and inverter 99. Storage registers 92, 94 and 96 are cleared by clear C Register (CLR CREG). Storage registers 92, 94 and 96 are preferably type SN74LS175N integrated circuits.

The decoded decisions about the comparison of the two twelve bit binary words are made available to combination logic comprising AND gates 107, 108 and OR gate 109. Specifically, the decoded decision indicating the existence of a binary word in the B Register that is greater than the binary word in the C Register is applied as an input to AND gate 107. Similarly, the decoded decision relating to the existence of a binary word in the B Register that is less than the binary word in the C Register is applied as an input to AND gate 108. In addition to the decoded decisional outputs from the comparator, the combination logic receives signals for checking the status of the comparison. These signals are A less than B check (A<B CHECK) and A greater than B check (A>B CHECK). The check signals are derived from a portion of the timing and control circuitry shown in FIG. 7.

Figure 6:
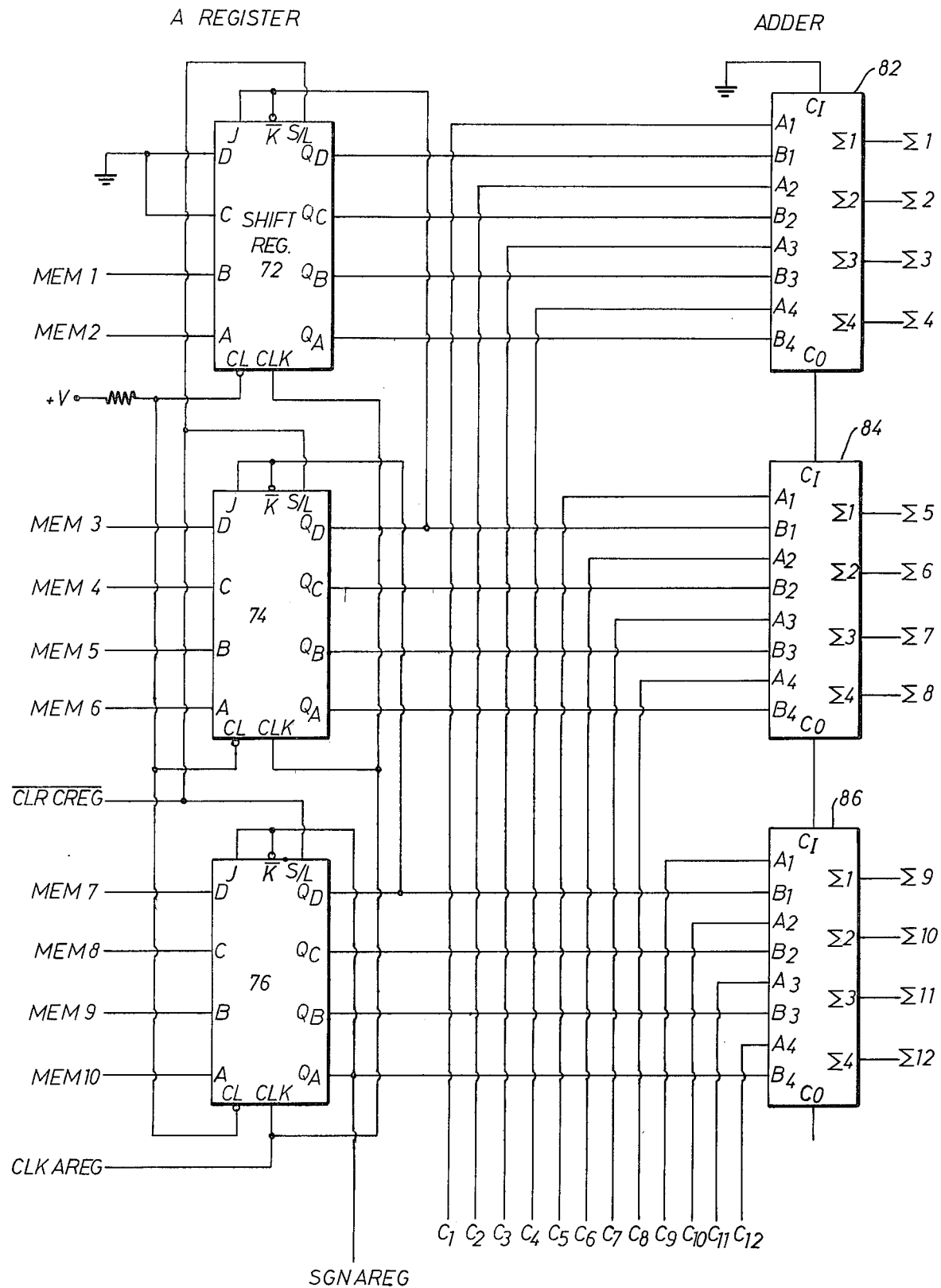

Referring now to FIG. 6, the A Register is shown to be implemented in the preferred circuitry by four bit parallel access shift registers 72, 74 and 76. The shift registers are clocked by clock A Register (CLK AREG). The shift/load input to shift registers 72, 74 and 76 is CLR CREG, which causes the shift register to parallel load data from the solid state memory whenever it is "low" and a clock transition occurs. Shifting is accomplished by CLK AREG pulses when the shift/load control input is "high". Shift registers 72, 74 and 76 are preferably type SN74LS195 in integrated circuits.

The contents of shift registers 72, 74 and 76 form a twelve bit binary word that is applied to Adder 80 which comprises four bit binary full adders 82, 84 and 86. In addition to receiving the contents of the A Register, the adders receive the binary word in the C Register over lines C1–C12. Adders 82, 84 and 86 each perform the addition of 2 four bit binary numbers. Sum outputs are provided for each bit, and a carry output ($C_0$) provides a carry out to the carry input of the succeeding adder. The sum of the two binary numbers contained in the A and C Registers is output over the summation lines back to the input of the C Register shown in FIG. 5. Preferably, binary adders 82, 84 and 86 are type SN5483N integrated circuits.

Figure 7:
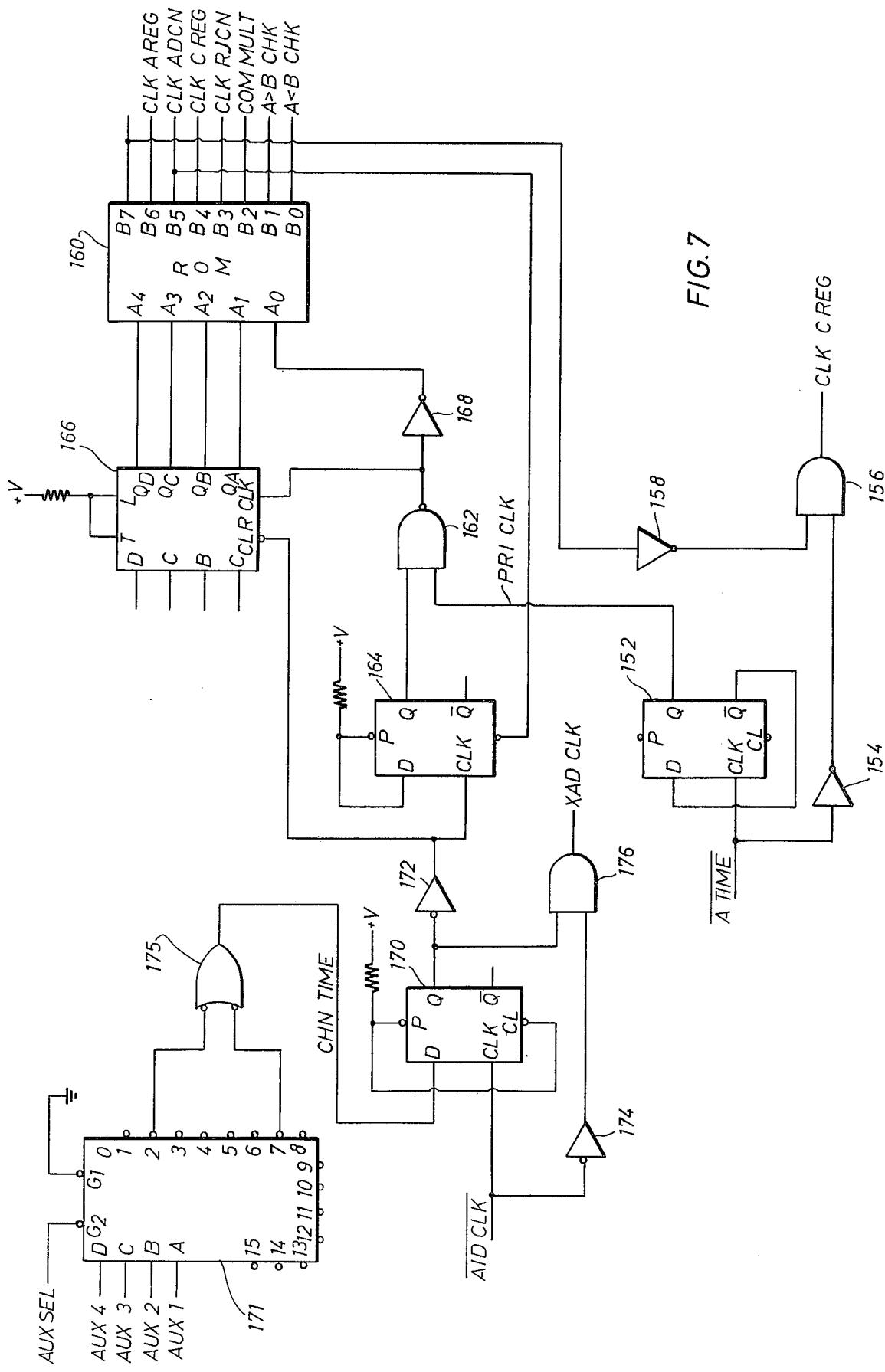
Figure 8:
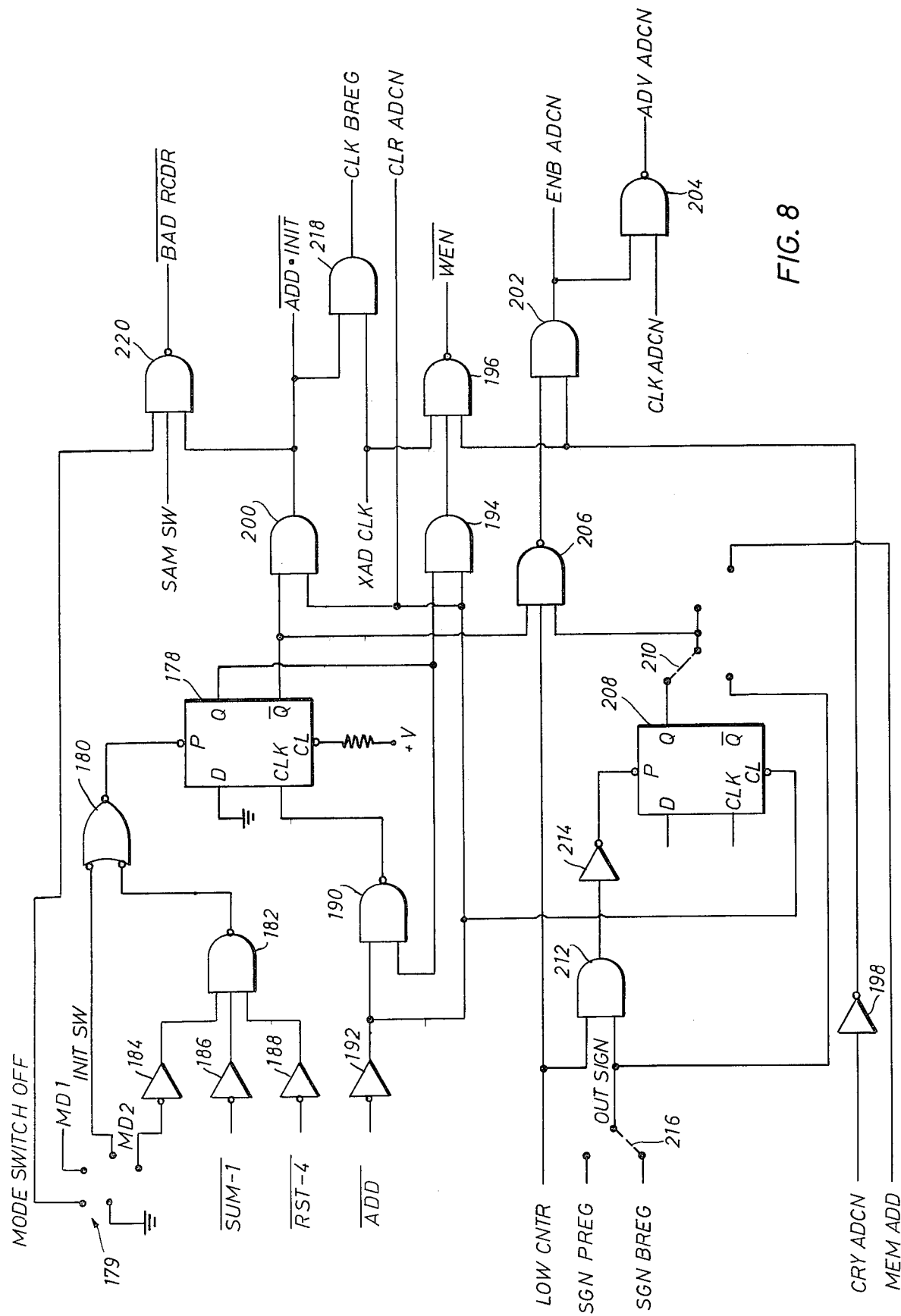

The circuitry for implementing timing logic 60 is presented in FIGS. 7 and 8. The timing and control functions necessary in the Signature Evaluation Apparatus are generated using signals available from the field recorder. The basic clock for the signature evaluator is A TIME.

In FIG. 7, A TIME is applied to the clock input of D type flip-flop 152 and to inverter 154, the output of which is applied as an input to AND gate 156. A TIME along with a signal derived from the $B_4$ output of ROM 160 and made available via inverter 158 generates the C Register clock (CLK CREG).

Flip-flop 152 has the $\overline{Q}$ output fed back to the D input, thereby dividing the frequency of A TIME by one-half. The Q output is connected to one input of NAND gate 162. The second input to NAND gate 162 is from the Q output of flip-flop 164. The output of gate 162 is applied directly to the clock input of four bit counter 166, and after inversion by inverter 168 is applied to the $A_0$ input of ROM 160. The remaining four inputs to ROM 160 are derived from the outputs of counter 166.

Clocking of D flip-flop 164 and clearing of counter 166 is by a signal derived from D flip-flop 170 via inverter 172. Flip-flop 170 is clocked by the A/D converter clock (A/D CLK), and the D input thereof receives as an input a channel timing signal (CHN TIME) obtained from channel address decoder 171.

Channel address decoder 171 receives four binary coded inputs AUX1, AUX2, AUX3 and AUX4, designating the auxillary channel selected by the recorder logic for connection to the IFP amplifier. The code presented is decoded into one of sixteen mutually exclusive outputs when auxillary select (AUX SEL) goes "low". Since the signature is input to the IFP amplifier over auxillary channels two and seven to obtain a 2 msec. sample rate, the "2" and "7" outputs of channel decoder 171 must both be decoded. Decoding of those outputs is by OR gate 173. Decoder 171 is preferably a type SN74154N integrated circuit.

The A/D clock is also applied to inverter 174, the output of which is combined with the Q output of flip-flop 170 by AND gate 176 to derive a delayed A/D clock (XAD CLCK).

The contents of ROM 160, addressed by counter 166, is used to control the A Register, the C Register, the Adder and the Multiplier Register in performing a multiplication function and to provide other control signals. A chart of the contents of ROM 160 for each memory address is provided in the table below.

| ROM CHART | | | | | | | | | | | | | |
|---|---|---|---|---|---|---|---|---|---|---|---|---|---|
| WORD | A0 | A1 | A2 | A3 | A4 | B0 | B1 | B2 | B3 | B4 | B5 | B6 | B7 |
| 0 | 0 | 0 | 0 | 0 | 0 | | | 1 | | | 1 | | 1 |
| 1 | 1 | 0 | 0 | 0 | 0 | | | 1 | | 1 | 1 | | 1 |
| 2 | 0 | 1 | 0 | 0 | 0 | | | 1 | | 1 | 1 | 1 | 1 |
| 3 | 1 | 1 | 0 | 0 | 0 | | | 1 | | | 1 | | 1 |
| 4 | 0 | 0 | 1 | 0 | 0 | | | 1 | | 1 | | | |
| 5 | 1 | 0 | 1 | 0 | 0 | | | 1 | | | 1 | | 1 |
| 6 | 0 | 1 | 1 | 0 | 0 | | | 1 | | | 1 | 1 | |
| 7 | 1 | 1 | 1 | 0 | 0 | | | 1 | | | 1 | | 1 |
| 8 | 0 | 0 | 0 | 1 | 0 | | | 1 | | | 1 | 1 | |
| 9 | 1 | 0 | 0 | 1 | 0 | | | 1 | | | | | 1 |
| 10 | 0 | 1 | 0 | 1 | 0 | | | 1 | | | 1 | 1 | |
| 11 | 1 | 1 | 0 | 1 | 0 | | | 1 | | | | | 1 |
| 12 | 0 | 0 | 1 | 1 | 0 | 1 | 1 | | | | 1 | | 1 |

-continued

ROM CHART

| WORD | A0 | A1 | A2 | A3 | A4 | B0 | B1 | B2 | B3 | B4 | B5 | B6 | B7 |
|------|----|----|----|----|----|----|----|----|----|----|----|----|----|
| 13 | 1 | 0 | 1 | 1 | 0 | 1 | 1 |   |   | 1 |   |   | 1 |
| 14 | 0 | 1 | 1 | 1 | 0 |   |   | 1 | 1 | 1 |   |   | 1 |
| 15 | 1 | 1 | 1 | 1 | 0 |   |   |   |   | 1 | 1 | 1 | 1 |
| 16 | 0 | 0 | 0 | 0 | 1 |   |   |   |   | 1 |   |   | 1 |
| 17 | 1 | 0 | 0 | 0 | 1 |   |   |   |   | 1 |   |   |   |
| 18 | 0 | 1 | 0 | 0 | 1 |   |   |   |   | 1 |   |   | 1 |
| 19 | 1 | 1 | 0 | 0 | 1 |   |   |   |   | 1 | 1 |   |   |
| 20 | 0 | 0 | 1 | 0 | 1 |   |   |   |   | 1 |   |   | 1 |
| 21 | 1 | 0 | 1 | 0 | 1 |   |   |   |   | 1 | 1 |   |   |
| 22 | 0 | 1 | 1 | 0 | 1 |   |   |   |   | 1 |   |   | 1 |
| 23 | 1 | 1 | 1 | 0 | 1 |   |   |   |   | 1 | 1 |   |   |
| 24 | 0 | 0 | 0 | 1 | 1 |   |   |   |   | 1 |   |   | 1 |
| 25 | 1 | 0 | 0 | 1 | 1 | 1 |   |   |   | 1 |   |   | 1 |
| 26 | 0 | 1 | 0 | 1 | 1 | 1 |   | 1 |   | 1 |   |   | 1 |
| 27 | 1 | 1 | 0 | 1 | 1 |   |   |   |   | 1 | 1 |   |   |
| 28 | 0 | 0 | 1 | 1 | 1 |   |   |   |   | 1 |   |   | 1 |
| 29 | 1 | 0 | 1 | 1 | 1 |   |   |   |   |   |   |   | 1 |
| 30 | 0 | 1 | 1 | 1 | 1 |   |   |   |   |   |   |   |   |
| 31 | 1 | 1 | 1 | 1 | 1 |   |   |   |   |   |   |   |   |

With reference now to FIG. 8, preferred circuitry for implementing the Mode Logic and an additional portion of the Timing Logic is shown therein. The Mode Logic centers around the initialize flip-flop 178, the setting of which is controlled in accordance with the mode of operation selected on the Mode Switch 179 for the Signature Evaluation Apparatus. The primary mode control signals are the initialize switch signal (INIT SW) and the Mode 2 switch signal (MD2 SW). Selection of the "initialize" position of switch 179 puts a "low" condition on INIT SW, which is detected by negative input NOR gate 180. When the condition of this signal is "low", initialize flip-flop 178 is set. Flip-flop 178 can also be set by gate 180 if a "low" condition is on the output of NAND gate 182 as a result of switch 179 being turned to the Mode 2 position, and the recorder is being reset and is in a sum mode. The three signals MD2, SUM and RST are applied, after inversion by inverters 184, 186 and 188, as separate inputs to NAND gate 182.

Initialize flip-flop 178 is clocked by a signal derived from NAND gate 190. Inputs to NAND gate 190 are the Q output of flip-flop 190 and a signal (ADD) from inverter 192. Since the D input of flip-flop 178 is at a logic zero condition, it will upon being clocked be reset, provided the preset input thereto has been released.

The Q output of initialize flip-flop 178 is applied along with ADD to AND gate 194. The logic decision decoded by AND gate 194 is made available to NAND gate 196 along with the delayed A/D clock (XAD CLK) and the output of inverter 198, which presents the inversion of the adder carry signal (CRY ADN). The output signal derived is write enable ($\overline{WEN}$) which controls writing into memory 20. The signal CRY ADCN is a signal from the carry output of memory address counter 50 shown in FIG. 4 and occurs after the counter has reached its maximum count and goes back to zero.

With continued reference the FIG. 8, the remaining portion of the circuitry shown therein is an additional portion of the Timing Logic required for control of the various functional blocks of the Signature Evaluation Apparatus. Basically, the remaining logic in FIG. 8 comprises combination logic for combining various signals to derive timed signals for controlling specific blocks of the Signature Evaluation Apparatus. For example, AND gate 200 combines the signal available from the $\overline{Q}$ output of flip-flop 178 with ADD from inverter 192 to derive a signal (EN RJTC) for enabling or inhibiting operation of the reject counter. Signals for enabling the memory address counter and advancing the memory address counter, ENB ADCN and ADV ADCN, are derived from AND gate 202 and NAND gate 204, respectively. The advance address counter signal from NAND gate 204 is derived by combining the enable address counter signal from AND gate 202 with the clock address counter signal (CLK ADCN) available from ROM 160 in FIG. 7.

The address counter enable signal is itself derived from the address counter carry signal from inverter 198 and a signal derived from NAND gate 206. One of the inputs to NAND gate 206 is obtained from the $\overline{Q}$ output of the initialize flip-flop 178. A second input is low count reached (LOW CNTR) generated by the decode logic shown in FIG. 4 and made available from OR gate 58. The third input to NAND gate 206 is obtained from a selected signal source. The third input signal may be that of the Q output of flip-flop 208, a signal (OUT SIGN) representative of the sign, i.e., positive or negative of the amplitude of the incoming signature samples, or a memory address signal (MEM ADD) from the $Q_d$ output of memory address counter 50. The particular source of the third input signal to NAND gate 206 is hard wire selectable by a hard wire connection 210. In the circuitry shown in FIG. 8 the connection is made to the Q output of flip-flop 208.

Flip-flop 208 is utilized as a resettable latch, with the preset input thereto being connected to logic comprising AND gate 212 and inverter 214. Inputs to AND gate 212 are low count reached (LOW CNTR) and the output sign signal (OUT SIGN), which is derived by a hard wire connection 216 to the 1Q output of storage register 32 in FIG. 5. Flip-flop 208 provides storage for the sign of each incoming signature sample word that is entered into the B Register. Flip-flop 208 is subject to being set after a predetermined number of initial samples of the incoming signature have been made when the sign of a signature sample word in the B Register is negative. Setting of flip-flop 208 acts through NAND gate 206 to disable the address counter and prevent further sample comparison operation. Flip-flop 208 is reset by the output of inverter 192 and is so held until ADD goes true.

Finally, in FIG. 8, logic for generating the B Register clock is provided by AND gate 218 which receives the output of AND gate 200 and the delayed A/D clock (XAD CLK). Logic for setting a bad signature indication in the recorder is provided by NAND gate 220 which outputs bad recorder (BAD RCDR) based upon the condition of the output of AND gate 200, of samples switch signal (SAM SW), and whether the mode switch is in the "OFF" position.

Referring now to FIG. 9, preferred circuitry for developing the binary number by which the reference standard sample word is to be multiplied to derive the limit envelopes is presented. This circuitry implements the Multiplier Register 120 and the Reject Limit Switch 130 in the functional block diagram of FIG. 3.

In FIG. 9, the Reject Limits Switch is shown as an arrangement of three "on-off" switches generally indicated by the reference numeral 130. The switches are given a weighted binary value in order to represent a three bit binary code. Each switch has one pole connected to ground and the other switch pole connected to a pull-up resister. Accordingly, by selective closing of the switches, a binary number between zero and seven can be established on the reject switch output lines 132.

The binary number defined by the reject limits switch setting is applied to a four bit true/complement device 230. Operation of the true/complement elements of the device is controlled by its B and C inputs. With the B input "low", as shown by virtue of the input being tied to ground, the four bit binary input word is transferred to the output in either complementary form, with the C input low, or true form with the C input high. The condition of the C input is set by the complement multiplier signal (COM MULT) output by ROM 160 of FIG. 7. Device 230 is preferably a type SN74H87 integrated circuit. The fourth input bit to device 230 is always a logic "1" by virtue of the input being tied to a positive voltage potential sufficiently large to exceed the required threshold level.

The four bit code available from the $Y_1$ through $Y_4$ outputs of device 230 is applied to a four bit adder circuit 232. The second four bit binary number applied to the adder is zero established by tying all B inputs to ground. The carry-in input is connected to inverter 235 which presents the inverted value of the complement multiplier signal. Adder 232 functions to add the multiplier number to zero, subject to the condition of the carry-in input. The resulting sum is made available over the sum output lines. Device 232 is required to complete the formation of the proper lower limit multiplier by adding a "1" to the complemented binary number. Accordingly, the E1 through E4 outputs of adder 232 correspond to the LSB, $Q_2$, $Q_1$ and MSB of the multiplier format as previously described. Adder 232 is a type SN7483N integrated circuit.

The four bit multiplier number available from adder 232 is entered into four bit parallel-access shift register 234. Shift register 234 implements the Multiplier Register block 120 shown in FIG. 3. The clock signal applied to shift register 234 is the A Register clock (CLK AREG). Parallel loading and shifting is under the control of the shift/load control input. Parallel loading of shift register 234 is accomplished by applying the four bit multiplier word to the shift register inputs and taking the shift/load control input "low", the data is loaded and appears at the output after a positive transition of the A register clock. Shifting is accomplished when the shift/load control input is "high" and a positive transition of the A Register clock occurs.

After the multiplier number has been loaded into the multiplier register it will be output serially from the $Q_D$ output one bit at a time starting with the MSB. The multiplier output (OUT MULT) is applied as an input to NAND gate 98 in FIG. 5.

Referring now to FIG. 10, circuitry for implementing the Reject Counter 110 comprises a four bit binary counter 112 clocked by a signal derived from logic combining ENB RJCN, SAM SW, ENB ADCN, LOW CNTR. The logic for "ANDING" together these four signals comprises AND gate 114 and NAND gate 116. The output of NAND gate 116 is inverted by inverter 118 before application to the clock input of counter 112. Also the "negative true" output of the sample switch is inverted by inverter 120 to be a compatable input to NAND gate 116. Counter 112 is cleared by a signal derived from the output of AND gate 200 in FIG. 8.

Each Q output of counter 112 is connected to the cathode of a diode 119a, 119b, or 119c. The anode of each diode is connected to the Reject Samples Switch 140 shown within the dotted lines. More specifically, the anode of diode 119a is connected to a pull-up resister 142a that is also connected to the single pole contact of reject samples bit switch 144a. In a similar manner, the anode of diode 119b is connected to a pull-up resister 142b and to switch 144b. A similar connection is made between the anode of diode 119c, pull-up resister 142c and switch 144c. The reject samples bit switches 144 are interconnected, with a connection from a common junction being the output of the switch 140. As shown, this lead is connected to the input of inverter 120.

Reject Samples Switch 140 sets a binary number representing the number of samples of the incoming signature pulse that are allowed to fall outside the area of acceptance before a bad recording indication is provided to the seismic data recorder. Reject Samples switch 140 therefore acts as a selectable decoding device to decode the output of counter 112. The manner in which the reject samples switch decodes counter 112 can best be understood by way of an example. As happens to be shown as an example in FIG. 10, the reject sample count set by the switches is "three". Since reject counter 112 is initially at a count of zero, the cathode of each diode 119 is grounded. Accordingly, the sample switch output is a logic "zero". At count "one" of the reject counter, the $Q_a$ output goes "high" releasing the cathode of diode 119a from ground. The sample switch output remains "low", however, since a "low" condition remains on the $Q_b$ output of reject counter 112. Following two more rejections of signature samples, the count will be "three", and both the $Q_a$ and the $Q_b$ outputs of counter 112 will be "high" releasing both pull-up resisters 142a and 142b. Under such condition, the sample switch output will go "high" and indicate that the reject sample number limit has been reached.

III. Operation of the Illustrative Embodiment

Operation of the circuitry of the Signature Evaluation Apparatus can be in one of two distinct phases of operation. In the first phase, the circuitry operates to acquire and store a reference standard signature against which subsequent signatures are compared. Acquisition of the reference standard signature is by inputting a seismic source signature to the evaluation apparatus in the form of a plurality of digitized samples, and storing the resulting digital words in memory. To make sure that the signature to be used as the reference standard is acceptable, the pulse shape of the signature can be monitored on a oscilloscope.

In the second phase, an incoming signature of a subsequent source activation is analyzed by comparing it with the reference standard signature previously acquired. If the incoming signature fails to conform to the reference standard signature within a prescribed tolerance, an indication is set to instruct the seismic data recorder to reject the incoming data.

In understanding the operation of the circuitry shown in FIGS. 4–10, reference will be made on occasion to the timing diagram of FIG. 11 and to the ROM chart set forth previously herein.

Operation of the Signature Evaluation Apparatus to acquire and store samples of a reference standard signature generally involves the loading into memory of the digitized samples of the reference standard signature under the control of the address counter and the timing logic. Accordingly, the circuitry shown in FIGS. 4, 7 and 8 will be principally involved in phase one operation.

Referring first to FIG. 8, in order for the Signature Evaluation Apparatus to acquire mode switch 179 must be turned to the "initialize" position placing a logic "0" as an input to negative input NOR gate 180 and causing initialize flip-flop 178 to be set.

Since this phase of operation centers around the writing of the reference standard signature samples into memory, generation of the write enable signal ($\overline{WEN}$) will be focused on. Write enable is generated by NAND gate 196 shown in FIG. 8 and is applied to the write enable input (WE) of each of memories 24, 26 and 28 in FIG. 4.

Because all channels of the field recorder, seismic data channels as well as auxilliary channels, are routed to the A/D converter of the IFP amplifier, data other than samples of an incoming signature will be presented to the inputs of the memory. Therefore, in order to generate $\overline{WEN}$ only during th time at which data belonging to the incoming signature is available, a signal must be derived to indicate the presence of signature data on the A/D converter output. Identification of the point in time at which the source signature is being routed to the A/D converter is provided by decoder 171 in FIG. 7.

Decoder 171 is enabled by auxilliary select signal (AUX SEL) when an auxilliary channel is being selected by the field recorder apparatus. The particular auxilliary channel that is connected to the IFP amplifier is decoded from the AUX1 through AUX4 address lines in the field recorder. Since the incoming signature is tied to two auxillary channel input in the IFP amplifier to obtain a sample rate of 2 msec., two outputs of the decoder must be decoded. This is is accomplished by OR gate 173. The signal (CHN TIME) derived by decoding the auxillary channel code designates the time at which data entered in the A/D converter should be considered as belonging to the incoming signature.

A logic "1" at the output of gate 173, indicating that data in the A/D converter is signature data, is set-up at the D input of flip-flop 170 in FIg. 7. At the trailing edge of the A/D clock, flip-flop 170 is set. Flip-flop 170 delays CHN TIME until the next A/D clock pulse in order to provide sufficient time for the A/D converter data to be set-up at the memory inputs before $\overline{WEN}$ is generated.

With continued reference to FIG. 7, a set condition at the Q output of flip-flop 170 presents a logic "1" to AND gate 176. At the occurrence of a pulse of the A/D converter clock, a logic "1" will be input from inverter 174 to the second input of AND gate 176, generating what is termed a delayed A/D converter clock (XAD CLK). The output of AND gate 176 is applied as an input to NAND gate 196 in FIG. 8 to act as the strobe signal in generating write enable.

Referring again to FIG. 4, the reference standard signature is acquired and stored in the memory as sixteen words of ten bits each. Each ten bit reference standard signature sample word is presented to the memory over lines A/D1 through A/D10. Since inversion takes place in the memory chips 24, 26 and 28, the sample word bits must be pre-inverted by inverters 22a-22j. Although the combined capacity of the memories is twelve bits, the sample words are only ten bits. Accordingly, two memory cells within memory 24 are not utilized. The outputs of memories 24, 26 and 28 are designated as MEM1 through MEM10.

When the recorder sets ADD, memory address counter 50 is released for counting, and NAND gate 196 is enabled by AND gate 194 for generating $\overline{WEN}$. Memory address counter 50 is counted up at the occurrence of advance address counter pulses from NAND gate 204 in FIG. 8. The address counter clock (CLK ADCN) is derived from the B5 output of ROM 160 in FIG. 7 and is gated by ENB ADCN from AND gate 202 in FIG. 8. CLK ADCN is gated through AND gate 204 when the apparatus is operating in Mode 1. That is, when initialize flip-flop 178 is set, establishing a logic "1" through NAND gate 206 to AND gate 202. Until the last memory address has been reached, whereupon CRY ADCN from the carry output of address 50 goes "high", a logic "1" is output by AND gate 202, permitting CLK ADCN to be passed to the address counter.

Figure 11:
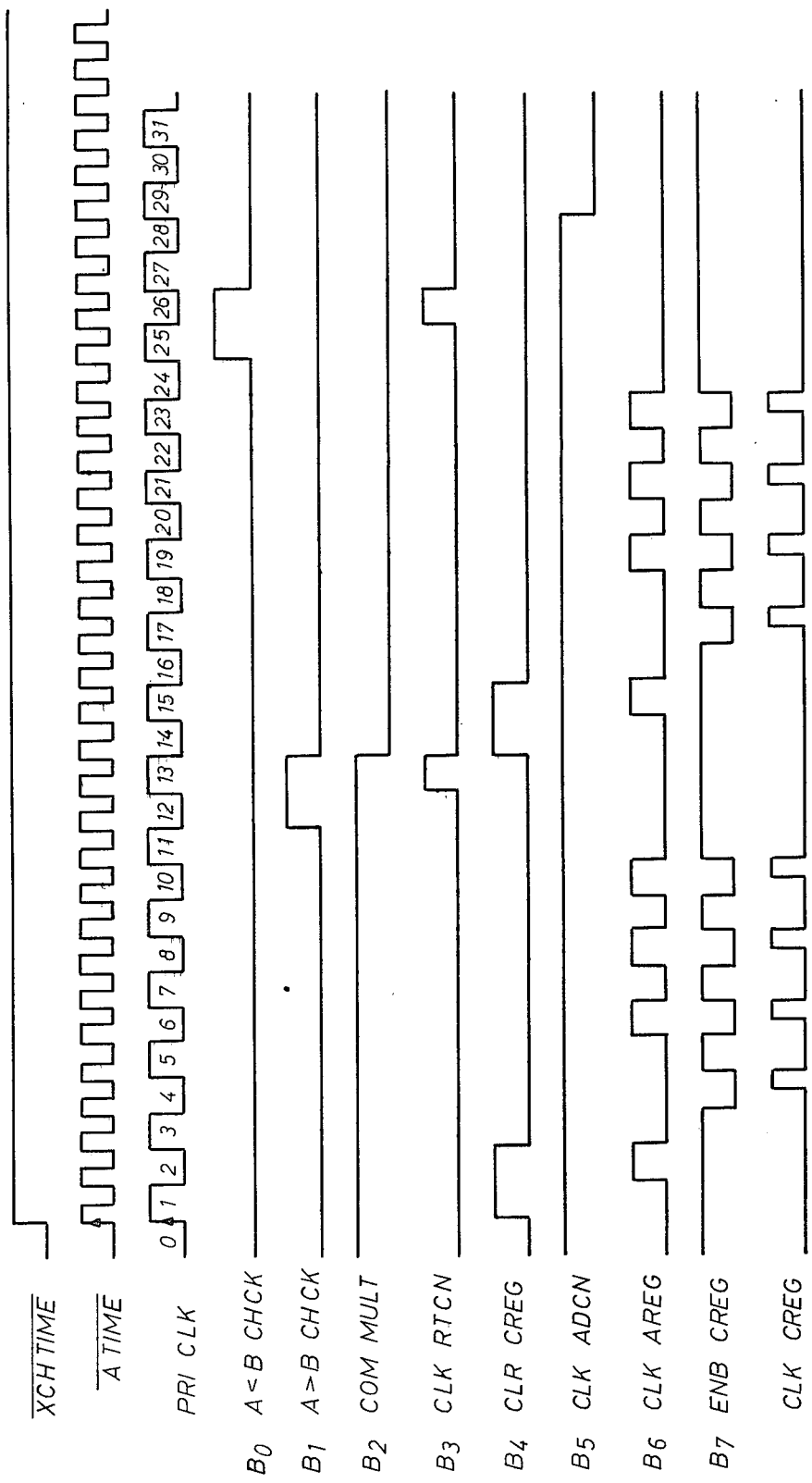
FIG. 11 is a timing diagram illustrating the major control signals and operational states of the signature evaluation apparatus.

To understand the manner in which CLK ADCN is generated, reference will now be to the circuitry in FIG. 7, the timing diagram of FIG. 11, and the ROM chart. As will be readily apparent, the timing diagram in FIG. 11 represents one sample comparison cycle of the Signature Evaluation Apparatus. However, the same cycle is initiated for each sample of the reference standard signature, although the functions such as entry of data into the B Register and the setting of BAD to the recorder are disabled by setting of the initialize flip-flop. Therefore, a discussion of ROM 160 operation is in point at this time.

The primary clock for the apparatus is that labeled PRI CLCK in the timing diagram. This clock defines thirty-two separate states of the signature evaluation apparatus circuitry. PRI CLCK is derived by A TIME, which is obtained from the MDS-8 field recorder by one-half. Division of A TIME by one-half is accomplished by flip-flop 152 in FIG. 7, with PRI CLCK being available from the Q output thereof. PRI CLCK is gated through NAND gate 162 in FIG. 7 and applied to ROM 160 via inverter 168. Accordingly, the $A_0$ input of ROM 160 is utilized as a clock input, with the signal from inverter 168 serving as a ROM clock.

Gating of PRI CLCK is in accordance with the condition of the Q output of flip-flop 164 wich is set to a logic "1" by a clock pulse derived from the output of inverter 172. Such a clock pulse is generated by inverter 172 when the Q output of flip-flop 170 transitions from a logic "1" to a logic "0". Such transition of the Q output of flip-flop 170 occurs after the flip-flop has been reset by clocking of device following the passage of CHN TIME from gate 173. More simply stated, PRI CLK is gated on after an incoming signature sample has been input to the signature evaluation apparatus and written into memory.

The output of NAND gate 162 is also applied as the clock signal to counter 166 which serves as the address counter for ROM 160. The clock pulse applied to flip-flop 164 also releases counter 166 for counting, and after being released, counter 166 changes the binary address code output to ROM 160 with each occurrence of PRI CLCK. The address count output from counter 166 changes on the negative-going transition of PRI CLK because of the inversion introduced by NAND gate 162.

As the address code input to ROM 160 changes, the outputs of the device will assume a state in accordance with the ROM chart. As shown in the chart, and as further depicted in the timing diagram, the $B_5$ output of the ROM which is the CLK ADCN signal, remains "high" until near the end of a sample cycle. The $B_5$ output of ROM 160 makes and "high" to "low" transition and back to "high" at the end of the cycle. Accordingly, memory address counter 50 in FIG. 4 is advanced at the end of each sample cycle to a new memory address code. When memory address counter 50 has reached its maximum count of fifteen, indicating that all sixteen samples of the incoming signature have been loaded into memory, CRY ADCN goes "high" to disable NAND gate 196 in FIG. 8 and prevent further writing into memory.

Acquisition of the reference standard signature is done under operator's command after power-up or any time during a set-up to meet new terrain conditions. The apparatus is "initialized" to acquire a new reference standard by turning the mode switch to the "initialize" position and bring it back to either "Mode 1" (MD1) or "Mode 2" (MD2). Initialize flip-flop 178 is reset by a clock pulse produced by NAND gate 190 at the trailing edge of ADD after the first recorder summation. When manual initialization only is desired, the Mode switch should be kept in the MD1 position, whereupon the same reference standard signature will be used over and over again until the operator decides that a new standard is required and manually reintializes the apparatus. In Mode 2, the initialize flip-flop is set every time the recorder is in the sum state, that is on the first drop of every drop segment. It is to be understood that ADD is a signal obtained from the recorder and is set when the recorder is placed in the "stacking" mode.

The second phase of operation of the signature evaluation apparatus is a comparison cycle in which an incoming signature is compared against the reference standard signature acquired during the acquisition cycle of operation. The timing diagram of FIG. 11 will again be instrumental in a clear understanding of the operation of the circuitry shown in FIGS. 4–10 during phase two.

In this phase of operation, the incoming signature sample available from the A/D converter in the IFP amplifier is loaded into storage registers 32, 34 and 36 (B Register) shown in FIG. 5. The ten bit data word is loaded into the storage register at the occurrence of CLK B REG which is derived from AND gate 218 in FIG. 8.

Referring now to FIG. 8, the B Register clock is derived from the delayed A/D clock (XAD CLK) which is derived from AND gate 176 in FIG. 7 in the manner described in connection with the discussion of the acquisition cycle of operation. XAD CLK is gated by AND gate 218 in accordance with the output of AND gate 200. CLK B REG will be generated at each occurrence of XAD CLK when ADD is set by the recorder and initialize flip-flop 178 is not set.

At the same time that an incoming signature sample word is being loaded into the B Register, the time correlated sample of the reference standard signature is unloaded from memory into shift register 72, 74 and 76 (A Register) shown in FIG. 6. The sample word is loaded at the occurrence of CLK AREG derived from the $B_6$ output of ROM 160 in FIG. 7 during state two of the cycle. The reference standard signature word to be loaded is addressed out of memory in accordance with the output of memory address counter 50, the operation of which is the same as during the acquisition cycle.

CLK AREG is output by ROM 160 in accordance with the state of counter 166. As shown in the ROM chart, CLK AREG is issued from time to time during the operational cycle to shift the reference standard sample word, as will be more fully explained in connection with the multiplication function carried out within the apparatus.

The data word loaded in shift registers 72, 74 and 76 is added to the contents of storage registers 92, 94 and 96 (the C Register) in FIG. 5. The C Register is initially cleared by CLR CREG derived from the $B_4$ output of ROM 160. As shown in the timing diagram, CLR CREG occurs during states one and two of the cycle.

After the incoming signature sample word has been loaded into the B Register, the time correlated reference standard signature word has been loaded into the A Register, and the C Register has been cleared, the incoming signature sample word is compared against the upper and lower limits set in accordance with the magnitude of the reference standard signature sample and the reject tolerance set by the operator.

Referring to FIG. 7, as noted previously, PRI CLK is gated through NAND gate 162 by the output of flip-flop 164. In a comparison cycle, flip-flop 164 enables NAND gate 162 only for the time necessary to compute the upper rejection limit and the lower rejection limit for one sample comparison, followed by a waiting period for the next incoming signature sample as identified by CHN TIME.

The contents of the A Register and the C Register are added together by adders 82, 84 and 86, with the output sum being brought back to the inputs of the C Register. At that time, the sum has a value equal to the reference standard signature word value B plus zero. The binary word representing the sum is set up at the inputs of the C Register and is loaded into the C Register at the occurrence of CLK CREG generated by AND gate 156 in FIG. 7, subject to the bit value of the multiplier contained in multiplier register 234 in FIG. 9. The multiplier value set by the rejection limit switch 130, and presented at the inputs of register 234 in the manner previously outlined, was entered into the multiplier register 234 at the same time that the A Register was loaded. Since the first comparison to be made is to the upper rejection limit, COM MULT out from the $B_2$ output of ROM 160 is a logic "1" putting device 230 in the non-complementing state.

Since the MSB of the multiplier Ku is a "1", OUT MULT from multiplier register 234 will enable NAND gate and a clock pulse will appear on the LOD CREG line entering the output of the adder into the CREG. The earlier discussed example, where Ku was 1.011 for an upper limit, corresponds to the situation where MSB is a 1 and the sum Y plus zero is loaded into the C Register.

After initial loading of the A Register, it is set into the shift mode and each of the next three pulses on the CLK AREG line causes the contents of the A Register and of the multiplier register to shift to the right one place at a time. At the same time, ENB CREG from the $B_7$ output of ROM 160 will permit generation of CLK CREG for loading of the C Register depending upon the contents of the multiplier register. And in accordance with the discussion just given of the loading of the C Register, it will follow that every time a "1" is output from the multiplier register 234, a C register load pulse will be generated.

In the example of Ku equal 1.011, after the first C Register load pulse has entered V+0 into the register, the value V is present on the outputs of the C Register and consequently on the inputs of the adder. The next pulse on the CLK AREG line will shift the A Register contents one place to the right and therefore present one-half V at the adder input. In the example, the next significant bit is a logic "0", therefore LOD CREG will not be generated and $V+\frac{1}{2}V$ will not be loaded into the C Register which retains only V. The next pulse on the CLK AREG line shifts the contents of the A Register one more place to the right, making the output value $\frac{1}{4}V$. This value added to V is entered into C Register since the next output bit from the multiplier register is a "1". At this point, the C Register contains $V+\frac{1}{4}V$. The next pulse on the CLK AREG line shifts the A Register another place to the right and presents a value of $\frac{1}{8}V$, which is added to the contents of the C Register making it $V+\frac{1}{4}V+\frac{1}{8}V$. This sum is the final result and is entered into the C Register since the LSB of the multiplier is a "1". The end result is $V(1+\frac{3}{8})$ which is the desired upper rejection limit for this particular sample of the reference standard. At this point in time, the apparatus has gone through ten states on the timing diagram.

The contents of the C Register and the B Register are compared by the comparator. If the sample of the incoming signature is greater than the upper limit, this result is decoded by the comparators and a logic "1" is output over the "A greater than B" output line of comparator 102 and is applied to AND gate 107. A signal is output from the $B_1$ output of ROM 160 to check for "A greater than B" during state twelve. In response to this check, the signal ENB RJCN to enable the reject counter goes "high".

By the end of state thirteen, the upper rejection limit has been computed and compared to the sample of the incoming signature, and if it was greater than the limit, the rejection counter was incremented. If the sample was "equal to" or less than the limit set, the rejection counter was not incremented.

Operation proceeds with a comparison of the incoming signature sample to a lower rejection limit. If the upper limit was exceeded, there is no point in doing so because the sample is not going to be less than the lower limit; however, the apparatus for simplicity is left running, although it has no effect of the reject counter.

During state fourteen, COM MULT from the $B_2$ output of ROM 160 goes "low" and causes the complement of the reject limit switch to be applied to adder 132 and added to "1" by reason of the complement of COM MULT being applied to the carry-in input of adder 132 by inverter 235. Operation then proceeds with the C Register being cleared and the A Register being reloaded from memory. The contents of the A Register is again added to zero and presented as an input to the C Register. The value of V plus zero will not, however, be loaded since the MSB of the multiplier word is a "0". This is necessarily so since the limit to be establlished is lower than the reference standard signature sample value. At the occurrence of the next pulse of CLK AREG, the contents of the A Register is shifted to present the value of $\frac{1}{2}V$ to be added with zero and output by the adder. In the example where K1 is 0.101, the value $\frac{1}{2}V$ will be loaded into the C Register be reason of the $Q_1$ bit of the multiplier being a "1". The next CLK AREG pulse shifts the A Register in and presents $\frac{1}{4}V$ for addition to $\frac{1}{2}V$ contained in the C Register. In the example, the $Q_2$ bit is a "0", and accordingly the value will not be entered into the C Register. The final CLK AREG pulse will shift the contents of the A Register another place to present $\frac{1}{8}V$ which will be added to the present contents of the C Register which is $\frac{1}{2}V$, yielding a sum of $\frac{5}{8}V$. Since the LSB of the multiplier is a "1", the value $\frac{5}{8}V$ will be entered into the C Register and presented to comparators 102, 104 and 106 for comparison with the incoming signature sample value in the B Register.

At the beginning of state twenty-five, the $B_0$ output of ROM 160 goes "high" to provide the "A less than B" check signal decision which is applied along with the A less than B output of comparator 102 to AND gate 108. If the sample of the incoming signature is less than the lower rejection limit, ENB RJCN will go high and the reject counter will be incremented.

The last event to occur within the comparison cycle is that the address counter clock (CLK ADCN) available from the $B_5$ of ROM 160 in FIG. 7 goes low and resets flip-flop 164, preventing the ROM address counter 166 from being incremented any further. The same CLK ADCN pulse also increments the memory address counter, presenting the next address in the sequence to the memories and causing the next reference sample to be presented to the A Register. The apparatus then awaits the occurrence of the next channel time indicating that a new sample of the incoming signature is available.

Referring now to the reject counter circuitry shown in FIG. 10, ENB REJN as described earlier comes true every time a sample of the incoming signature falls outside the rejection limits. ENB RJCN is therefore a train of pulses at a rate which is a function of the signature pulse shape. Each pulse, representing a rejection, will advance counter 112 until a number of rejected samples, as prescribed by the projection limits samples switch, has been reached. Thereupon, the SAM SW line goes "high" and is used to set BAD at the output of NAND gate 220 in FIG. 8. The signal ENB RJCN will be gated through NAND gate 116 as long as SAM SW remains "high" and as long as LOW CNTR and ENB ADCN are "high".

LOW CNTR is generated by the combination logic shown in FIG. 4 that decodes the memory address counter outputs. LOW CNTR is provided to permit the reject counter from being advanced until a minimum count of 1, 2 or 3 has been reached by the memory address counter. This feature is included to prevent the first 2 or 3 samples of the incoming signature to influence the rejection count, as it is believed that the first few samples are of little significance.

ENB ADCN is a function designed to stop the memory address counter whenever a carry from the address counter occurs or the sign of the incoming signature word goes negative. The memory address counter is stopped upon the occurrence of a carry from the address counter in order to prevent an overflow of the memory which would occur in the event that, after a count of fifteen, the counter would go back to zero and the memory would start outputting the same data again.

In order to look at only the positive lobe of an incoming signature, and thereby disregard all the ringing of the trailing edge, both the memory address counter and the reject counter are inhibited if the sign of an incoming signature sample word goes "high". Flip-flop 208 in FIG. 8 is provided to monitor the sign of the incoming signature sample words from the B Register. The sign bit is obtained from the 1Q output of storage register 32 in FIG. 5 and is denoted as SGN BREG. This signal is brought over to the circuitry in FIG. 8 and applied to AND gate 212 at OUT SIGN. After the low count has been reached, if OUT SIGN goes "high" indicating a negative sample value, flip-flop 208 will be set and ENB ADCN will disable NAND gate 204.

The foregoing description of the invention has been directed to a particular preferred embodiment for purposes of explanation and illustration. It will be apparent, however, to those skilled in this art that the invention can be practiced utilizing apparatus other than that specifically disclosed and described herein. For example, the source signature can be analyzed by techniques other than that described herein, and the results obtained by an analysis of the source signature can be utilized in seismic data acquisition apparatus in other ways than as described herein. It is intended that the following claims cover such other embodiments and applications of the invention as might be hereinafter put into practice.

We claim:

1. In apparatus for receiving and recording reflected seismic waves produced in the earth's strata by an energy pulse transmitted thereto from an emission source, the improvement comprising:

means for determining the conformity of an energy pulse emitted by an emission source to a reference energy pulse by comparing a plurality of samples of the emitted energy pulses to time correlated samples of the reference energy pulse; and means to inhibit recording of reflected waves produced by an emitted energy pulse, when a preselected number of samples of the emitted energy pulse do not compare with time-correlated samples of the reference energy pulse.

2. The apparatus of claim 1 wherein said determining means comprises:

means for analyzing an electrical signal representative of the energy pulse.

3. The apparatus of claim 2, further comprising:

means for establishing an upper reference standard amplitude limit and a lower reference standard amplitude limit, with the deviation of the amplitude limits from a reference standard sample being proportional to the amplitude of the reference standard signal sample.

4. The apparatus of claim 3, further comprising:

means for counting the number of electrical signal samples that either exceed the upper amplitude limit or fail to achieve the lower amplitude limit.

5. The apparatus of claim 3 wherein said means for establishing upper and lower signal sample amplitude limits comprises:

means for multiplying each reference standard signal sample by a multiplier.

6. Apparatus for determining the conformity of the shape of an energy pulse produced by a weight-drop seismic source with a defined energy pulse shape, comprising:

means for providing samples of an electrical signal representative of a reference standard energy pulse;

means for comparing each of a plurality of samples of the amplitude of an electrical signal representative of a generated energy pulse to a reference standard amplitude level set for each particular sample, the samples being provided in time to correlation with the samples of the electrical signal representative of a generated energy pulse;

means responsive to the comparison of each sample for indicating whether the shape of a generated energy pulse substantially conforms to a defined pulse shape; and means for establishing upper and lower reference standard amplitude levels for comparison to each sample of the electrical signal representative of a generated energy pulse, the limits of the upper and lower levels being proportional to the amplitude of each reference standard signal sample.

7. The apparatus of claim 6 wherein said establishing means comprises:

means for providing a multiplier number, and means for multiplying each reference standard sample by the multiplier.

8. The apparatus of claim 7 wherein said multiplying means comprises a sequential, weighted adder circuit that computes a product by adding binary words of varying values.

9. The apparatus of claim 6 wherein said establishing means sets upper and lower reference standard amplitude level limits that are symmetrical about their respective reference standard sample.

10. The apparatus of claim 6 wherein said indicating means comprises:

means for counting the number of samples of the electrical signal that fail to compare to the reference standard amplitude level set within a prescribed tolerance.

11. Apparatus for analyzing an electrical signal to determine the conformity of the shape of the signal waveform over a defined period of time to a reference standard signal waveform shape, comprising:

means for providing samples of the amplitude of a reference standard signal;

means for establishing upper and lower electrical signal sample amplitude reference limits for each sample of the electrical signal being analyzed, with the upper and lower limits established being proportional to the amplitude of the respective time correlated sample of the reference standard signal; and means for comparing each sample of the electrical signal being analyzed to its respective upper and lower electrical signal sample amplitude reference limits.

12. The apparatus of claim 11 further comprising:

means for counting the number of samples of the electrical signal being analyzed that fail to fall between the established upper and lower sample reference limits.

13. The apparatus of claim 11 wherein said means for establishing the upper and lower sample amplitude reference limits comprises:

means for multiplying each sample of the reference standard by a multiplier; and means for providing a prescribed multipler.

14. The apparatus of claim 11 wherein:

said means for providing samples of the amplitude of a reference standard signal comprises a memory having stored therein a plurality of binary words.

15. The apparatus of claim 11 wherein said means for establishing the upper and lower sample amplitude reference limits comprises:

means for multiplying a binary word read out of memory by a prescribed multiplier;

said multiplying means comprising
        a shift register for loading a binary word read out of the memory and subsequently shifting the word upon timed command, a storage register for maintaining a binary word loaded therein, an adder for adding the binary word in said shift register to the binary word in said storage register, the output of the adder being fed back to the input of said storage register, means for providing a binary word multiplier, and timing logic for issuing a shift command to said shift register and for issuing a load command to said storage register.

16. In a method of seismic geophysical exploration wherein an energy pulse is generated and transmitted into the earth's strata with reflections of the pulse being received for recording, the steps comprising:

determining the conformity of the transmitted energy pulse to a reference energy pulse by comparing a plurality of samples of the transmitted energy pulse to time correlated samples of the reference pulse, and rejecting seismic data derived from reflections produced by a transmitted energy pulse, when a preselected number of samples of the transmitted energy pulse and the reference energy pulse do not compare.

17. In a method of seismic geophysical exploration wherein an energy pulse is generated by a weight-drop seismic source and transmitted to the earth's strata with reflections of the pulse being received for recording, the steps comprising:

generating an electrical signal representative of the energy pulse generated by the impact of the weight on the ground;

intermittently sampling the amplitude of the electrical signal;

comparing each sample of the electrical signal to a reference standard amplitude level;

rejecting seismic data derived from reflections of the energy pulse if a certain number of samples fail to compare within a prescribed tolerance; and providing a separate upper and lower reference standard amplitude level limits for comparison to each sample of the electrical signal, the upper and lower limits being derived from samples of a reference standard signal representative of an energy pulse of defined amplitude characteristics.

18. The method of claim 17 wherein each set of upper and lower limits provided deviates from the reference standard samples in proportion to the amplitude of the reference standard signal sample.

* * * * *

UNITED STATES PATENT OFFICE
CERTIFICATE OF CORRECTION

Patent No. 4,246,652                     Dated January 20, 1981

Inventor(s) Tawassul A. Khan and Michel P. Moesse

It is certified that error appears in the above-identified patent and that said Letters Patent are hereby corrected as shown below:

The title of the patent should be --SEISMIC SOURCE SIGNATURE EVALUATION APPARATUS--.

*Signed and Sealed this*

*Twenty-third* Day of *June 1981*

[SEAL]

*Attest:*

RENE D. TEGTMEYER

*Attesting Officer*    *Acting Commissioner of Patents and Trademarks*